United States Patent

[11] 3,568,189

[72] Inventor Joseph L. Poirier
 26 Brian Road, Chelmsford, Mass. 01824
[21] Appl. No. 806,227
[22] Filed Mar. 11, 1969
[45] Patented Mar. 2, 1971

[54] SPECTRUM ANALYSIS RADAR SYSTEM FOR ANGLE DETERMINATION
 9 Claims, 5 Drawing Figs.
[52] U.S. Cl. .................................................. 343/16
[51] Int. Cl. .................................................. G01s 9/02
[50] Field of Search ......................................... 343/16, 14

[56] References Cited
 UNITED STATES PATENTS
 2,958,862 11/1960 Rey .............................. 343/14
 3,444,555 5/1969 Hammer ....................... 343/16

Primary Examiner—Rodney D. Bennett, Jr.
Assistant Examiner—T. H. Tubbesing
Attorneys—Harry A. Herbert and George Fine ABSTRACT: Spectrum analysis radar system in which the location of modulation nulls depends upon the exact electrical range to a target so that with two antennas separated by a known distance, the small difference in range to a target causes the null location to shift relative to each other to provide the angle of arrival of the reflected target.

SPECTRUM ANALYSIS RADAR SYSTEM FOR ANGLE DETERMINATION

CROSS-REFERENCE TO RELATED APPLICATIONS

In a prior U.S. Pat. application by Joseph L. Poirer entitled "Spectrum Analysis Radar System" filed Jul. 23, 1968 bearing Ser. No. 746,956, there was disclosed a radar system in which the location of modulation nulls depended on the exact electrical range to a target. The present invention utilizes the basic concept taught therein but further includes angle determination.

BACKGROUND OF THE INVENTION

This invention relates to a radar system and more particularly to a spectrum analysis radar for determining the angle of arrival of the reflected target signal.

In a spectrum analysis radar, the returned target signal is added to a reference signal derived from the original transmitted signal. Under certain conditions, the power spectrum of this sum signal is modulated. The modulation frequency is a linear function of the range and can be measured to determine the range to a target. This modulation persists even if there is no modulator on the transmitted signal. The only requirements are the transmitted signal be time stationary (i.e., a noiselike signal) and that the range to the target be equal to or greater than the ratio of the speed of light to the bandwidth of the signal.

It is further noted that this invention is an improvement of the aforementioned spectrum analysis radar which allows it to measure the angle of arrival of the reflected target signal. To determine the angle of arrival with a conventional spectrum analysis radar, its antenna must be rotated and pointed at the target. With this improvement, two antennas are needed instead of one but they need not be moved to determine the angle of arrival of a target signal.

In a spectrum analysis radar, the location of the modulation nulls depends on the exact electrical range to a target. Therefore, if two antennas separated by a known distance are used, the small difference in range to a target as seen by each of the antennas will cause the null locations of one to shift relative to the other. This shift in null position is proportional to the angle of arrival of the reflected signal.

It is pointed out that this is not an interferometric technique in which the intensity distribution of a pair of interferring signals is used to obtain higher resolution. Rather the comparison is made between the power spectra of two sum signals.

One of the novel features of the invention is the use of the shift in the locations of nulls in the power spectrum to determine the angle of arrival of the signal. The invention allows the angle of arrival of signals reflected from targets to be determined without moving the antenna system. This information is vital in completely determining the location of a target. The aforementioned improvement of the spectrum analysis radar could be utilized in such applications as space-docking radar and collision avoidance radar.

SUMMARY OF THE INVENTION

A spectrum analysis radar to measure the angle of arrival of a reflected signal from a target is provided. The spectrum analysis radar is a system in which a noise signal (time stationary signal) is transmitted toward a target of interest. A small part of the noise signal is coupled off and added to the target return signal. The spectrum of this sum signal will be modulated if the range R to the target, the speed of light $c$, and bandwidth $\Delta f$ of the noise signal satisfy the relation $R > c/\Delta f$. The modulation frequency is a linear function of the range and can be measured to determine the range to the target. The present invention provides two antennas for the spectrum analysis radar with a known distance separating them. The small difference in range to the target as seen by each of the antennas will cause the modulation null locations to shift relative to the other. This shift in null position is proportional to the angle of arrival of the reflected signal.

An object of this invention is to provide a spectrum analysis radar to measure the angle of arrival of a signal reflected from the target of interest.

Another object of this invention is to provide a spectrum analysis radar having two antennas disposed a predetermined distance from each other to permit the modulation null locations of returned target signals to shift relative to each other.

Yet another object of the present invention is to provide a spectrum analysis radar having two antennas separated a predetermined distance from each other for determining the angle of arrival of reflected target signals without moving the antennas.

Although the novel features which are believed to be characteristic of this invention will be particularly pointed out in the claims appended hereto, the invention itself, as to its objects and advantages, the mode of its operation and the amount of its organization may be better understood by referring to the following description taken in connection with the accompanying drawings forming a part thereof.

BRIEF DESCRIPTION OF THE DRAWINGS

FIG. 5 is a second block diagram of a spectrum analysis radar for angle determination.

Figure 1:
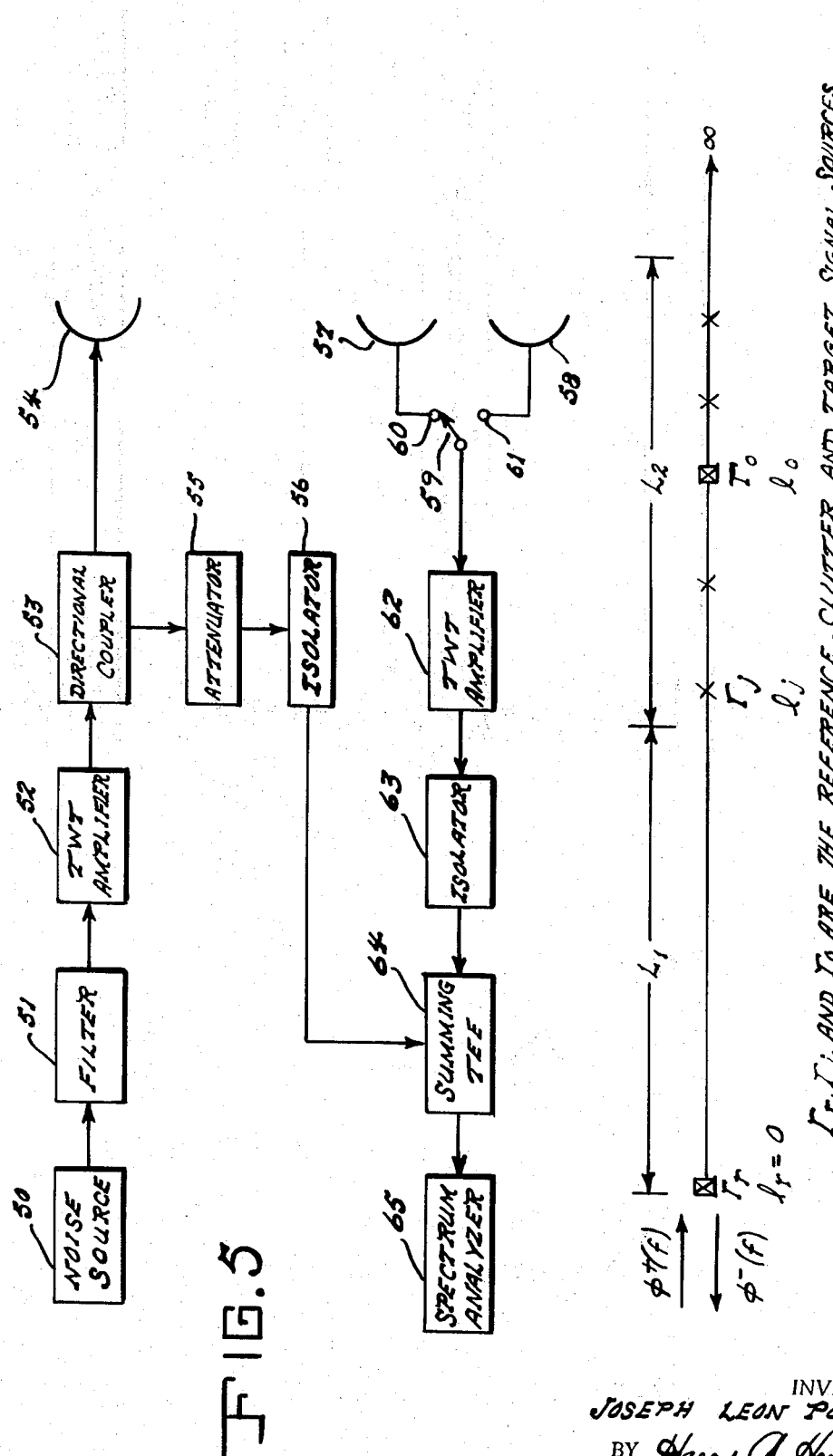
FIG. 1 is a pictorial representation of spectrum analysis radar systems parameters.

To completely describe the system of the present invention, the following theory is presented. The scattering of broadband signals from an array of randomly spaced discontinuities in a long transmission line was analyzed. Probability density functions for the power reflection coefficient at the input of the transmission line were obtained along with expressions for the means and variance of the power reflection coefficient. In these analyses, only the total intensity of the reflected signals was studied. It turns out, however, that under certain conditions, depending principally on the bandwidth of the illuminating signal and the spacing between adjacent discontinuities, the power spectrum of the total reflected signal is modulated. This modulation is not the result of any modulation of the illuminating signal and in fact occurs for unmodulated signals as well. It depends only on the random nature of the stationary quasimonochromatic illuminating signal.

Measurements have been made for two signal components (corresponding to two discontinuities) in which case the modulation frequency depends only on the relative path length difference between the two signals while the fractional modulation amplitude depends on their relative intensities.

The analysis of the scattering of stationary quasimonochromatic signals from an array of small discontinuities was extended to include the spectral characteristics of the total reflected signal. A result of this analysis is that under certain conditions, the range, magnitude, and phase of a distant reflector can be determined from the power spectrum of the reflected signal. Because of this, the application of power spectrum analysis to a radar is provided. Expressions are obtained for the useful range and resolution of such a radar and a comparison between its resolution and that of a conventional pulse radar is made. Particularly the use of this system to measure angular location of a target is described and claimed.

Although the theory can be applied to more complex problems, only the one dimensional case of an array of scatterers in a long transmission line will be treated. Consider a line of length L along which are distributed N scatterers with an average spacing L/N which is much greater then the mean wavelength $\lambda_0$ of the radiation. The voltage reflection coefficient $\Gamma_j$ of each scatterer is assumed to be small enough to satisfy the condition that $N|\Gamma_j|^2 \ll 1$. These two restrictions insure that multiple interaction effects can be neglected although the latter restriction is easily removed. Also, the individual reflection coefficients are assumed to be constant over the bandwidth $\Delta f$ of the illuminating signal which must satisfy the quasimonochromatic approximation $(\Delta f/f_o)<<1$. It is also assumed that the illuminating radiation is ergodic and time stationary so that ensemble averages may be replaced by suitably long time averages which depend only on time differences.

When the line is illuminated by a signal $V+(t)$ having a normalized (unit area) power spectrum $\Phi+(f)$, the total reflected voltage $V-(t)$ at the input to the line is given by $$V^-(t) = \sum_{j=1}^{N} \Gamma_j \exp\left[-2\alpha l_j\right] V^+(t-t_j) \quad (1)$$

where $\alpha$ is the attenuation constant of the line. The time $t_j$ is the total time required for the signal to reach the $j$th reflector and return to the input of the line and is equal to $2l/v$ where $l_j$ is the distance to the $j$th reflector and $v$ the propagation velocity.

The complex autocorrelation of equation (1) is given by $$<V^-(t+f)V^{-*}(t)> = \sum_{k=1}^{N}\sum_{j=1}^{N} \Gamma_k \Gamma_j^* \exp$$
$$[-2\alpha(l_k+l_j)]<V^+(t-t_k+t)V^{+*}(t-t_j)> \quad (2)$$

where the sharp brackets indicate the infinite time average associated with the autocorrelation and the new summation index $k$ has been used to account for all the cross-terms. The terms within the angular brackets in equation (2) are by definition, the self-coherence functions $\Gamma-(\tau)$ and $\Gamma+(\tau)$ of the reflected and incident signals $V-(t)$ and $V+(t)$, respectively. That is, $$\Gamma^-(f) = <V^-(t+f)V^{-*}(t)> \quad (3)$$

where $\tau$ is the time delay introduced in the correlation. The normalized form of $\Gamma-(\tau)$ or the complex degree of self-coherence is given by $$\gamma^-(\tau) = \frac{\Gamma^-(f)}{\Gamma^-(o)} = \frac{\Gamma^-(f)}{I^-} \quad (4)$$

where $I-$ is the time-averaged intensity of the total reflected signal. Furthermore, the complex degree of self-coherence and the normalized power spectrum of the signal form a Fourier transform pair so that $$\gamma^-(f) = \int_0^\infty \phi^-(f) \exp\left[-i2\pi ft\right] df \quad (5)$$

Equations (3), (4), and (5) when applied to both sides of equation (2) yield $$I^-\phi^-(f) = \sum_{k=1}^{N}\sum_{j=1}^{N} |\Gamma_k||\Gamma_j| \exp\left[2\alpha\{l_k+l_j\}\right] I^+\phi^+(f) \ldots$$
$$\ldots \cos\left[2\pi f\{t_j-t_k\} + \theta_j - \theta_k\right] \quad (6)$$

where $\theta_m$ and $\theta_k$ are the phases associated with the voltage reflection coefficient of the $j$th and $k$th reflectors.

If the round trip path length difference between any pair of reflectors is much smaller than the coherence length $l_c = v/\Delta f$, the argument of the cosine term in equation (6) will principally depend on $\{t_j-t_k\}$ over the bandwidth $\Delta f$ and $f$ may be replaced by the mean frequency $f_o$. Under these conditions equation (6) when integrated over all frequencies yields $$I^- = \sum_{k=1}^{N}\sum_{j=1}^{N} |\Gamma_k||\Gamma_j| \exp\left[-2\alpha\{l_k+l_j\}\right] I^+ \ldots$$
$$\ldots \cos\left[2\pi f_o\{t_j-t_k\} + \theta_j - \theta_k\right] \quad (7)$$

and $$\Phi^-(f) = \Phi^+(f) \quad (8)$$

Equations (7) and (8) are the well-known interference laws for coherent signals $(v|t_j-t_k|<<v/\Delta f)$.

Conversely, if $|t_j-t_k|>>1/\Delta f$ integration of equation (6) will cause the cosine terms to vanish, except when $j = k$ in which case we obtain $$I^- = \sum_{j=1}^{N} |\Gamma_j|^2 I^+ \exp\left[-4\alpha l_j\right] \quad (9)$$

Equation (9) is of course the law of incoherent addition of signal powers. The power spectrum of the total reflected signal in this case however is $$\phi^-(f) = \phi^+(f)\frac{I^+}{I^-}\sum_{K=1}^{N}\sum_{j=1}^{N}|\Gamma_K||\Gamma_j| \exp\left[-2\alpha\{l_j+l_K\}\right] \ldots$$
$$\ldots \cos\left[2\pi f\{t_j-t_K\} + \theta_j - \theta_K\right] \quad (10)$$

Equation (10) indicates that the power spectrum of the total reflected signal is modulated and that the modulation frequencies depend only on the relative time delays $|t_j-t_K|$ corresponding to the path length delays $|l_j-l_K|$. The frequency difference $\Delta f_m$ between successive nulls $f_n$ in $\Phi-(f)$ due to a component pair is easily shown to be from equation (10)

$$\Delta f_m = \frac{1}{|t_j-t_K|} = \frac{v}{2|l_j-l_K|} \quad (11)$$

The modulation occurs at $N(N-1)/2$ different frequencies corresponding to all possible distinct pair values of $j$ and $k$.

The fractional modulation amplitude $M_{jk}$ of each component pair depends on their relative intensities and is given by $$M_{jK} = \frac{I_{max}-I_{min}}{I_{max}+I_{min}} = \frac{2\Gamma_j\Gamma_K}{I^-} I^+ \exp\left[-2\alpha\{l_j+l_K\}\right] \quad (12)$$

where $I_{max}$ and $I_{min}$ are adjacent maximum and minimum values of the power spectrum. The phases $\theta_j$ of the reflectors fix the absolute location $f_n$ of the nulls in the power spectrum.

At this time it should be pointed out that the ratio $I+/I$ in equation (12) and elsewhere is the reciprocal of the power reflection coefficient $R$ at the input to the line. Expressions for $R$ and $p(R)$ the probability density function for $R$ when the scatterers are randomly distributed exist. If the line is incoherently illuminated $(l_c << |l_j-l_k|)$ the result is $$R = \frac{I^-}{I^+} = \sum_{j=1}^{N} |\Gamma_j|^2 exp[-4\alpha l_j] \quad (13)$$

In the partially coherent case equation (13) is much more complicated and $R$ depends on $\gamma+(\tau)$.

To demonstrate the application of equation (10), consider a long transmission line with only two reflectors $\Gamma'_1$ and $\Gamma'_2$ located at $l_1 = 0$ and $l_2$ respectively. For convenience, the signal attenuation has been lumped into the voltage reflection coefficient, i.e., $\Gamma'_2 = l_2 \exp[-2\alpha l_2]$. If $v/\Delta f - 2$, equation (13) can be used to write equation (10) as $$\phi^-(f) = \phi^+(f)\left\{1 + \frac{2|\Gamma_1'||\Gamma_2'|}{|\Gamma_1'|^2+|\Gamma_2'|^2}\cos\left[\frac{4\pi f l_2}{v}+\Theta_2-\Theta_1\right]\right\} \quad (14)$$

The frequency difference between nulls $\Delta f_m$, the fractional modulation amplitude $M_{12}$, and the absolute location $f_n$ of the nulls can be determined by measuring $\Phi-(f)$ with a spectrum analyzer. From these measurements there results $$l_2 = \frac{v}{2\Delta f_m} \quad (15)$$

and $$\Gamma_2^1 = \left\{\frac{1 \pm \sqrt{1-M_{12}^2}}{M_{12}}\right\}\Gamma_1^1 \quad (16)$$

from which $\Gamma_2$ may be obtained by using equation (15).

The phase of $\Gamma_2$ to within an uncertainty of $2\pi$ is found to be $$\theta_2 - \theta_1 + \left[ 211 + 1 - \frac{2f_n}{\Delta f_m} \right] \pi, \quad 11 = 0, \pm 1, \cdots \quad (17)$$

Because the location and characteristics of a distant reflector (target) can be determined from the power spectrum of the superposition of the reflected signal and part of the illuminating signal (derived from $\Gamma_1$ in the two reflector example) this system is in effect a radar.

FIG. 1 pictorially illustrates the application of power spectrum analysis to a radar problem in which a target $\Gamma_o$ at a range $l_o$ is immersed in clutter scatterers (assumed to be all equal) and $$L_1 \geq l_o = \frac{c}{\Delta f}$$

A portion of the transmitted signal $\Gamma_r V+(t)$ is used as the reference signal so that $l_r = 0$. For convenience the effects of free space attenuation are included in $\Gamma_o$ and the $\Gamma_j$ and the phase $\theta_r$ of the reference signal $\Gamma_r V+(t)$ is set equal to zero.

In the absence of clutter, measurement of $\Phi-(f)$ would yield $l_o, |\Gamma_o|$ and $\theta_o$ directly, analogous to the two reflector problems described by equations (14) through (17). However, in the presence of clutter, equation (10) will contain modulation components corresponding to $l_o$ plus all other combinations of scatterer ranges $l_j$ and $l_k$. The frequency difference between nulls for the terms involving $l_o - l_r$ and $l_j - l_r$, where $l_j$ is the range to one of the scatterers and $l_r = 0$ is given by equation (11). Those terms depending on the differences $|l_o - l_j|$ and $|l_j - l_k|$ may or may not produce modulations. If the coherence length $l_c = c/\Delta f < L_2/N$, modulations will be produced. While if $l_c$ is much greater than the interscatterer spacing equation (8) applies and no modulation is observed. Since the desired information is contained in the term $l_o - l_r$, the latter condition seems preferable. But there is yet another factor to be considered also effecting system performance, so it is not now possible to choose the conditions for best operation. However, if the cross-term modulations are present, they will be far removed in frequency from the fundamental modulation frequencies.

The fractional modulation amplitudes are given by equation (12) and are $$M_{jk} = \frac{2\Gamma_j \Gamma_k I+}{I-} \quad (18)$$

$$M_{jo} = \frac{2\Gamma_j \Gamma_o I+}{I-} \quad (19)$$

$$M_{jr} = \frac{2\Gamma_j \Gamma_r I+}{I-} \quad (20)$$

$$M_{ro} = \frac{2\Gamma_r \Gamma_o I+}{I-} \quad (21)$$

If the reasonable assumptions that $\Gamma_o >> \Gamma_j$, $\Gamma_r >> \Gamma_j$ and $N >> 1$ are made, $M_{jk}$, $M_{jo}$, and $M_{jr}$ will each be much smaller than $M_{ro}$. Thus a separation of the target return from the clutter return has been effected. This occurs because the modulation frequencies (due to the clutter) each with a small amplitude will be distributed more or less at random around the target frequency. The result then is a smearing of the modulations in the power spectrum; but the target modulation having a large amplitude will still dominate so long as $NT_j^2$ is not too large.

The denominator $I-$ appearing in equations (18) through (21) is the total intensity of the reflected signal. If $l_c$ is larger than the average interscatterer spacing $L_2/N$, $I-$ can vary widely from one observation to another as the phases of the clutter components change due to antenna or other motion. If the converse is true than $I-$ will not depend on the phases of the components (equation (9)) but be constant and equal to the mean intensity of the previous case. The most consistent measurements would then be obtained when $I-$ is constant and $l_c$ smaller than the interscatterer spacing thereby decorrelating the clutter return components.

Under these conditions, equation (21) becomes $$M_{ro} = \frac{2|\Gamma_r||\Gamma_o|}{|\Gamma_r|^2 + |\Gamma_o|^2 + |\Gamma_c|^2} \quad (22)$$

where $|\Gamma_c|^2$ is the total clutter power and equal to $(N-2)|\Gamma_j|^2$. If $\Gamma_r$ is made variable, the target modulation amplitude will be maximum when $|\Gamma_r|^2 = |\Gamma_o|^2 + |\Gamma_c|^2$. Equation (22) would then be $$M_{ro_{max}} = \frac{|\Gamma_o|}{\{|\Gamma_o|^2 + |\Gamma_c|^2\}^{1/2}} \quad (23)$$

At this point, expressions for the useful range and resolution of this system should be obtained in order to make more meaningful comparisons with conventional radars. Consider the system in which a Gaussian noise signal is used to illuminate a target 13. Part of the transmitted signal is added to the signal reflected from the target and observed on a spectrum analyzer. Now the sum signal spectrum analyzer output is passed through detector and high pass filter, the original sum spectrum will be converted to a new time function. A second spectrum analyzer can now be used to determine the frequency components present in the new time function. The following definitions for the useful range and resolution are based on a system of this type with the illuminating signal spectrum $\Phi+(f)$ given by $$\phi^+(f) = \frac{1}{\sigma\sqrt{2\pi}} \exp\left[ -1/2\left(\frac{f_o - f}{\sigma}\right)^2 \right] \quad (24)$$

For a single target with the reference signal adjusted to be equal to the target return signal the sum spectrum is $$\phi^-(f) = \frac{1}{\sigma\sqrt{2\pi}} \exp\left[ -1/2\left(\frac{f_o - f}{\sigma}\right)^2 \right] \left\{ 1 + \cos\frac{4\pi f R}{c} \right\} \quad (25)$$

and the new time function becomes after high pass filtering $$\bar{\phi} - (t) = \frac{K}{\sigma\sqrt{2\pi}} \exp\left[ -1/2 S_s^2 \left(\frac{t_o - t}{\sigma}\right)^2 \right] \frac{\cos 4\pi R S_s t}{c} \quad (26)$$

where $S_s$ is the sweep speed of the sum signal spectrum analyzer. The spectrum of equation (26), which is the product of two time functions, is the convolution of the spectra of the component time functions and results in a spectrum with a variance $\sigma'$ centered at the modulating frequency $f'_m = 2RS_s/c$.

The variance $\sigma'$ is a function only of the variance of the illuminating signal $\sigma$ and can be obtained by finding the transform of $$\exp\left[ -1/2 S_s^2 \left(\frac{t_o - t}{\sigma}\right)^2 \right]$$

The result is $$\partial' = \frac{S_s}{2\pi\sigma} \quad (27)$$

From equation (27) the range resolution $\Delta R$ can be defined. Two targets can just be resolved if their modulation frequencies $f'_m$ are separated by the width $2\partial$ of the spectral line. Therefore, $$\Delta R = 2\sigma \frac{dR}{df'_m} = \frac{\bar{C}}{2\pi\sigma} \quad (28)$$

The maximum useful range $R_{max}$ is determined by the effective i.f. bandwidth $\Delta f_a$ of the sum signal spectrum analyzer. To obtain good modulation characteristics $\Delta f_m > 10 \Delta f_a$ so that the maximum range then is $$R_{max} = \frac{c}{20 \Delta f_a} \quad (29)$$

The minimum range depends on the coherence length of the radiation since the range must be sufficiently great so that the reflected signal is no longer correlated with the reference signal this condition can be written as $$R_{min} = l_c = \frac{c}{\Delta f} \quad (30)$$

A comparison between the resolution of a conventional pulse radar and a spectral analysis radar can now be made. The resolution of a pulse radar can be expressed as $$\Delta R_p = \frac{c\tau}{2}$$

where $\tau$ is the pulse width. The transform of a pulse is a function of the form $(\sin x)/x$ which yields a power spectrum of the form $(\sin^2 x)/x^2$. The normalized power spectrum of a pulse then is $$\phi^+(f) = \frac{1}{\pi} \frac{\sin^2 2\pi f}{(2\pi f)^2} \quad (31)$$

and the power contained in the main lobe is $$P_p = \frac{2}{\pi} \int_0^\pi \frac{\sin^2 2\pi f}{(2\pi f)^2} d(2\pi f) \quad (32)$$

Numerical integration of equation (32) yields approximately $P_p = 0.90$. To compare $\Delta R$ to $\Delta R_p$ the frequency spread of the Gaussian is restricted so that only those frequencies which make up 0.90 of the total power are considered. The frequency extreme may be found by using the relation $$\frac{2}{\sqrt{\pi}} \int_0^{x_0} \exp[-x^2] dx = 0.90 \quad (33)$$

and solving for $x_o$. From tables, $x_o = 1.18$ and the relative amplitude of $\exp[-x^2]$ at $x = x_o$ is found to be 0.25 from which the required frequency extreme in equation (24) can be found in terms of $\sigma$. Matching the frequency extreme in the pulse and Gaussian spectra there results $1/\tau = 1.66\sigma$. The ratio of the resolution then is $$\frac{\Delta R_p}{\Delta R} = \pi \tau \sigma = 1.88 \quad (34)$$

Equation (34) indicates that a spectrum analysis radar operating with a bandwidth equivalent to a conventional pulse radar offers an 88 percent improvement in resolution.

Figure 2:
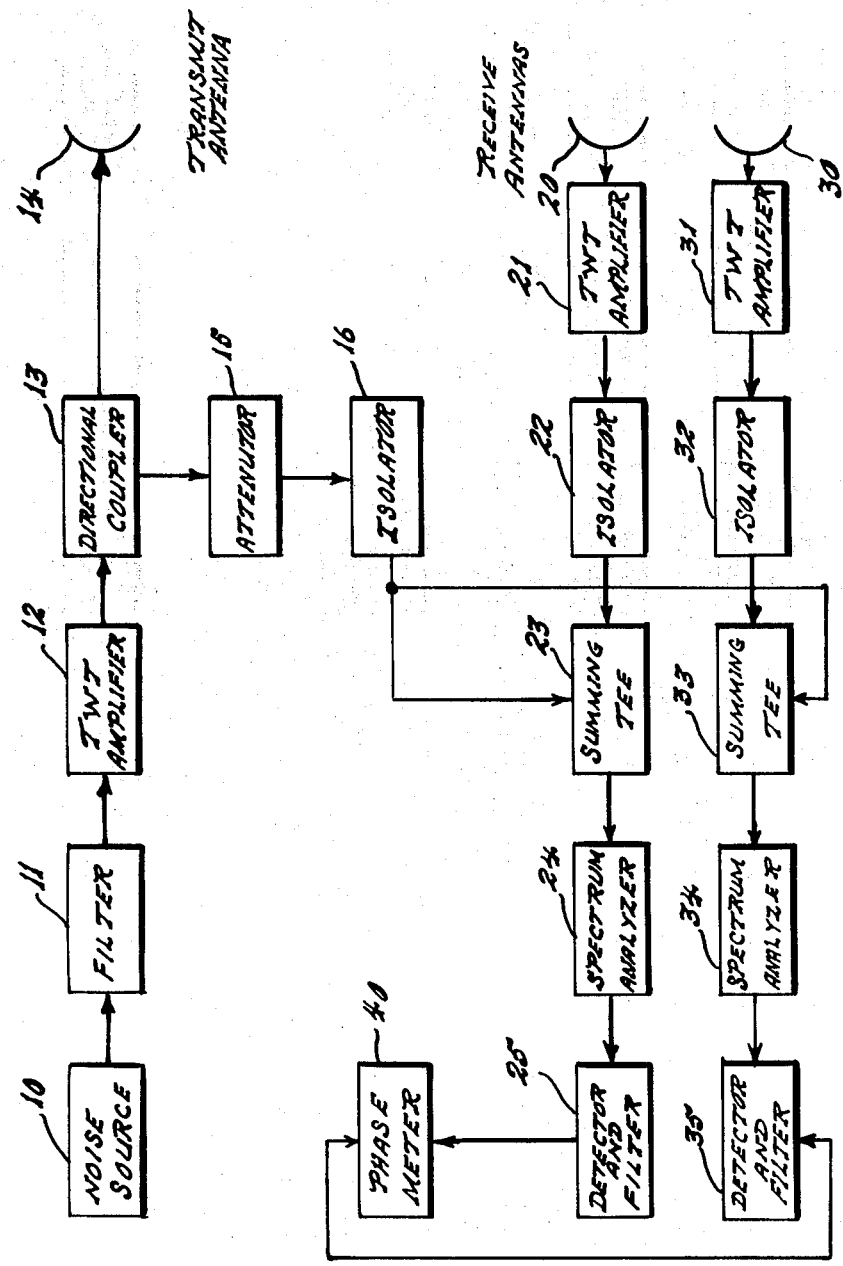
FIG. 2 is a block diagram representation of one spectrum analysis radar system for angular determination of a target of interest.

Now referring in detail to FIG. 2, there is shown noise source 10 which provides a stationary time signal such as unmodulated noise. The noise signal is fed to traveling wave tube amplifier 12 by way of filter 11 which restricts the bandwidth to a preselected value.

From amplifier 12 the noise signal passed to transmit antenna 14 by way of directional coupler 13. Antenna 14 directs the noise signal to a target of interest whose angle is to be determined.

The reflected signal from the target of interest is received by antennas 20 and 30 which are positioned a predetermined distance from each other so that the small difference in range to a target as seen by each of the antennas will cause the modulation null location of one to shift relative to the other. This shift in null position is proportional to the angle of arrival of the reflected signal.

The reflected signal from the target of interest received by antennas 20 and 30 are applied to summing tees 23 and 33 by way of traveling wave tube amplifiers 21, 23 and isolators 22 and 32, respectively. Simultaneously therewith, summing tees 23 and 33 receive a predetermined portion of the original noise signal (reference signal) by way of attenuator 15 and isolator 16. It is noted maximum response occurs when the reference signal is equal in magnitude to the reflected signal at the point of summation. It is further noted that by increasing the bandwidth of the noise signal accuracy and resolution may be improved. It is also emphasized that the bandwidth of the noise filter should be at least equal to the ratio of the speed of light divided by the range to the target; otherwise, no modulation of the power spectrum will occur.

The summed signals from summing tees 23 and 33 are fed to detector and filters 25 and 35 by way of spectrum analyzers 24 and 25, respectively. The outputs of detector and filters 25 and 35 are fed simultaneously to phase meter 40 to provide a measurement of relative phase and thus the angle of the target of interest.

Figure 3:
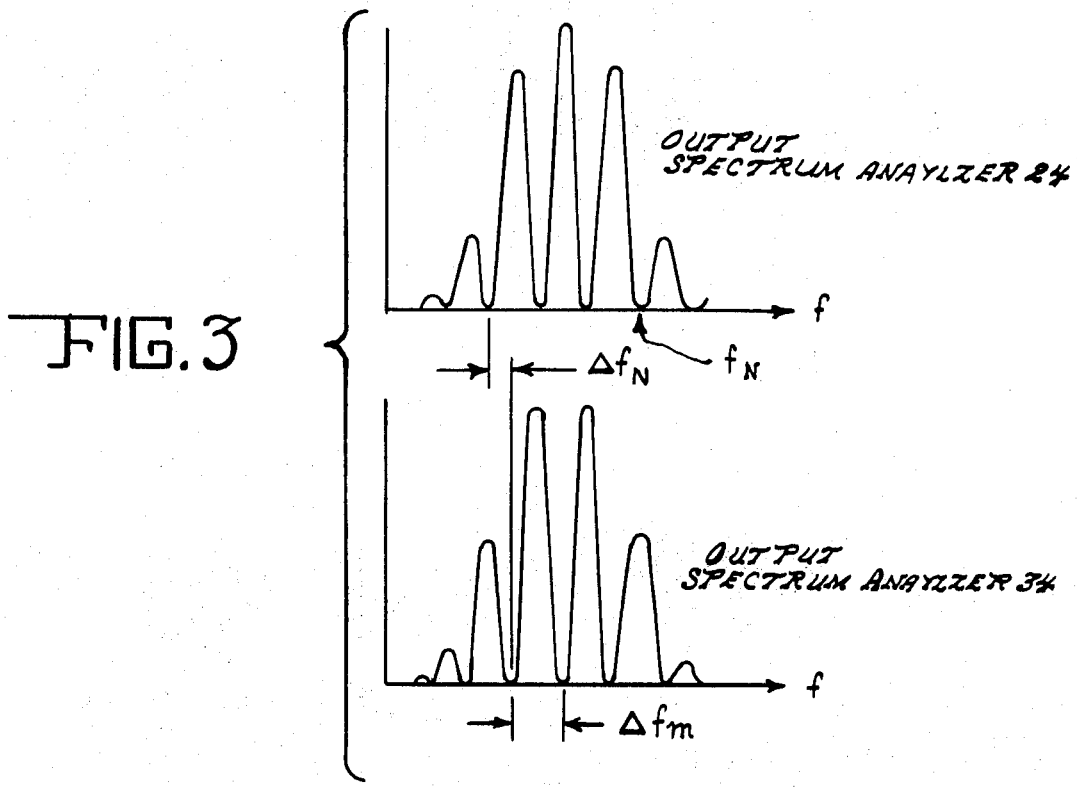
FIG. 3 is the spectra of the two receiver systems of FIG. 2.
Figure 4:
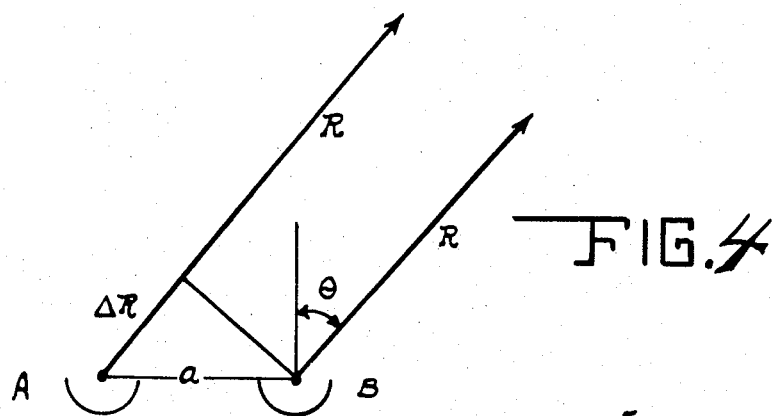
FIG. 4 shows the geometry of a two antenna system.

The outputs of spectrum analyzers 24 and 34 are shown pictorially in FIG. 3. The frequency difference $\Delta f_m$ between the nulls in the spectra is given by $$\Delta f_m = c/2R$$

where $c$ is the speed of light and $R$ the target range (see equation 11). The location $f_N$ of the nulls is given by $$f_N = (2n+1) c/4R$$

where $n$ is an integer. In normal operation the factor $2n+1$ is very large so that the null location $f_N$ is a sensitive function of range. In fact, a change of one-half wavelength in range is sufficient to move the null location by an amount equal to $\Delta f_m$. The geometry of the two receiver system of FIG. 2 is represented in FIG. 4. Since the range to the target as seen by each antenna differs by $\Delta R$, the nulls of one channel will be displaced from those of the other by an amount $\Delta f_N$. The frequency difference $\Delta f_N$ in the location of the nulls is related to the angle of arrival $\theta$ of the reflected signal by $$\sin \theta = \frac{\Delta f_N}{\Delta f_m} \frac{\lambda_o}{2a}$$

where $\lambda_o$ is the mean wavelength of the transmitted signal.

The measurement of $\Delta f_N$ (to determine $\theta$) can be accomplished in many ways. The most obvious is to detect and filter the spectra of FIG. 3 to obtain sinusoids (in actual operation the waveforms of FIG. 3 would be noisy and require detection and filtering to smooth them out). It then is only necessary to measure the relative phase of these two waveforms as indicated in the block diagram of FIG. 2. It should be pointed out, that in actual operation the spectra of FIG. 3 would have many oscillations and the duration of the waveform is more or less arbitrary depending on the sweep speed of the spectrum analyzer.

There is no need to have a completely separate receiving (or transmitting) system. One receiver could be time shared between two antennas or for that matter one system could be moved at some periodic rate. In these cases, however, a storage mechanism of some kind must be provided to remember the null location of one channel (or location) while that of the other is being measured. One such system is shown in FIG. 5. Here one receiver sequentially samples the output of two antennas at a rate which is fast compared to the persistence of the spectrum analyzer cathode ray tube display. In this way both spectra will be simultaneously present and the null shift can be measured directly with the spectrum analyzer frequency markers.

Now referring in detail to FIG. 5, there is shown noise source 50 generating a noise signal which is fed to traveling wave tube amplifier 52 by way of filter 51. Filter 51 has a predetermined bandwidth. Antenna 54 receives the amplified noise signal by way of directional coupler 53 and directs it to the target of interest. The reflected signals are received by antennas 57 and 58. The outputs of antennas 57 and 58 are connected to terminals 60 and 61 of switch 59. Switch 59 sequentially samples the output of the two antennas at a rate which is fast compared to the persistence of the spectrum analyzer cathode ray tube display. Switch 59 may be any conventional switch such as an electronically controlled one operating at a predetermined rate. The output of switch 59 is amplified in traveling wave tube 62 and applied to summing tee 64 by way of isolator 63. Simultaneously, summing tee 64 receives a predetermined portion of the original noise signal (reference signal) by way of attenuator 55 and isolator 56. The summed signal is fed to spectrum analyzer 65. In this way, both spectra are simultaneously present on the face of the cathode ray tube display and the null shift can be measured directly with the spectrum analyzer frequency markers to provide a measure of the angle of the target of interest. Thus the shift in the location of nulls in the power spectrum determines the angle of arrival of the reflected signal without moving the antenna system. This information is vital completely determining the location of a target.

In a general manner, while there has been, in the above description, disclosed what is deemed to be practical and efficient embodiments of the invention, it should be well understood that the invention is not limited to the exact structural arrangement and method disclosed, as there might be changes in the structural arrangement, disposition and form of the parts and method without departing from the principles of the present invention as comprehended within the scope of the accompanying claims.

I claim:

1. A spectrum analysis radar to measure the angle of arrival of a reflected signal from a target of interest comprising means to generate a stationary time signal, means to direct said stationary time signal to said target of interest, first and second antenna means to receive said reflected signals from said target of interest, said first antenna means being separated from said second antenna means by a predetermined distance to cause a small difference in range to said target of interest, means to select a predetermined portion of said stationary time signal, first summing means receiving simultaneously said predetermined portion of said stationary time signal and the output of said first antenna means to provide a first modulated resultant signal having nulls, second summing means also receiving simultaneously said predetermined portion of said stationary time signal and the output from said second antenna means to provide a second modulated resultant signal having nulls and means to measure the shift in nulls between said first and second resultant signals to provide said measure of angle.

2. A spectrum analysis radar as described in claim 1 wherein said means to measure said shift in nulls is comprised of first and second spectrum analyzers receiving said first and second resultant signals, respectively, first and second means to detect and filter the outputs of said first and second spectrum analyzers, respectively, and means to measure the phase difference between the outputs of said first and second detector and filter means.

3. A spectrum analysis radar as described in claim 1 further including filter means to restrict the bandwidth of said generated stationary time signal, and means to amplify the output from said filter means.

4. A spectrum analysis radar as described in claim 1 wherein said means to select a portion of said stationary time signal is comprised of a directional coupler, an attenuator receiving the output of said directional coupler and an isolator interconnecting said attenuator and said first and second summing means.

5. A spectrum analysis radar as defined in claim 1 further including first and second amplifying means receiving the output of said first and second antenna means, respectively, and first and second isolators interconnecting said first and second amplifying means and said first and second summing means, respectively.

6. A spectrum analysis radar as defined in claim 1 wherein said means to generate a stationary time signal consists of an unmodulated noise source.

7. A spectrum analysis radar to measure the angle of arrival of a modulated reflected signal from a target of interest comprising means to generate a stationary time signal, means to direct said stationary time signal to said target of interest, first and second antenna means to receive said modulated reflected signals from said target of interest, said first and second antenna means being separated a predetermined distance from each other to cause a small difference in range to said target of interest, means to sequentially sample the outputs of said first and second antenna means at a predetermined rate, means to select a predetermined portion of said stationary time signal, summing means receiving simultaneously said predetermined portion of said stationary time signal and the output of said sampling means, said summing means providing a modulated output signal having nulls, and comparison means connected to the output of said summing means to measure the difference between said nulls to provide a measure of said angle of arrival.

8. A spectrum analysis radar as described in claim 7 wherein said means to generate a stationary time signal consists of an unmodulated noise source.

9. A spectrum analysis radar as described in claim 7 further including filter means to restrict the bandwidth of said stationary time signal, a first amplifier receiving the output of said filter means, a transmitting antenna, a directional coupler interconnecting said first amplifying means and said transmitting antenna, and an attenuator also connected to said directional coupler, said attenuator providing an input signal to said summing means.